United States Patent
Elliott et al.

(10) Patent No.: US 8,028,046 B2
(45) Date of Patent: Sep. 27, 2011

(54) SYSTEM AND METHOD OF CONFIGURING A NETWORK DEVICE

(75) Inventors: Shane Michael Elliott, Haslet, TX (US); Kenneth Winburn, Weatherford, TX (US); Scott Mote, Dupo, IL (US); Blaine Thomas, Allen, TX (US); Ty Robertson, Boerne, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 717 days.

(21) Appl. No.: 11/880,892

(22) Filed: Jul. 23, 2007

(65) Prior Publication Data

US 2009/0031008 A1   Jan. 29, 2009

(51) Int. Cl.
G06F 15/16 (2006.01)
(52) U.S. Cl. ...................................................... 709/220
(58) Field of Classification Search .................... 709/220
See application file for complete search history.

(56) References Cited

U.S. PATENT DOCUMENTS

| | | | |
|---|---|---|---|
| 6,587,874 B1 * | 7/2003 | Golla et al. ................... 709/220 |
| 6,704,752 B1 | 3/2004 | Kathail et al. | |
| 7,003,692 B1 | 2/2006 | Banks et al. | |
| 7,031,263 B1 | 4/2006 | Sun et al. | |
| 7,054,924 B1 * | 5/2006 | Harvey et al. ................. 709/220 |
| 7,742,479 B1 * | 6/2010 | Kotha et al. .................... 370/392 |
| 2002/0057340 A1 * | 5/2002 | Fernandez et al. ........... 348/143 |
| 2005/0114846 A1 | 5/2005 | Banks et al. | |
| 2006/0007944 A1 * | 1/2006 | Movassaghi et al. ......... 370/401 |
| 2006/0268834 A1 * | 11/2006 | Bajic .............................. 370/352 |
| 2007/0165865 A1 * | 7/2007 | Talvitie ......................... 380/286 |
| 2009/0007216 A1 * | 1/2009 | Ku et al. ........................ 725/142 |

\* cited by examiner

*Primary Examiner* — Wing Chan
*Assistant Examiner* — Andrew Woo
(74) *Attorney, Agent, or Firm* — Toler Law Group

(57) ABSTRACT

In a particular illustrative embodiment, a method of configuring a network device is disclosed that includes determining network device information at a network device using a boot strapping protocol during an initial set-up process of the network device. The method further includes automatically modifying a configuration profile of the network device to connect to a network in a first device mode using the network device information. The method also includes receiving configuration information transmitted from a configuration server without requesting the configuration information. The configuration information includes routing information and configuration parameters particular to the network device. The method further includes automatically modifying the configuration profile of the network device to operate in a second device mode based on the configuration information. The first device mode is a non-operational mode and the second device mode is an operational mode.

24 Claims, 11 Drawing Sheets

SYSTEM AND METHOD OF CONFIGURING A NETWORK DEVICE

FIELD OF THE DISCLOSURE

The present disclosure is generally related to a system and method of network device configuration.

BACKGROUND

In large networks, multiple network devices are typically configured with various configuration parameters, including Internet Protocol (IP) addresses, security policies, quality of service parameters, and other network information. For example, such network devices may include routers and switches, which may be configured to route media content, including text data, audio data, video data, or any combination thereof. In a particular illustrative example, such network devices may route media content between a content provider and customer premises devices, such as set-top box devices in an Internet Protocol television (IPTV) network. Generally, each network device may include configuration parameters that are common to other network devices (such as subnet and domain information) and may include configuration parameters that are unique to the particular network device (such as a unique IP address).

Conventionally, a network administrator or field technician configured each network device with a full complement of configuration parameters. However, in complex networks, configuring network devices may require thousands of lines of instructions, and manual configuration may result in errors. To enhance manual installations, such configuration parameters may be stored at a configuration server and the configuration parameters can be accessed and installed manually. However, such manual configurations are time consuming.

Alternatively, the network device can be configured to automatically retrieve the configuration parameters from the configuration server. Such conventional server-based procedures for automatically configuring network devices typically use a boot-strap protocol, such as BOOTP, which may be stored in a memory of the network device and which may be executed at the network device to connect to the network. Such network devices may also utilize a trivial file transfer protocol (TFTP) to automatically retrieve the set of configuration parameters from the server when the network device is connected to the network or when the network device is powered on. Unfortunately, such automated download processes generally require that the configuration parameters stored at a central server are up-to-date at the time that the network device is connected to the network. Further, such automated configuration downloads are typically initiated by the network device, which downloads may not be controlled by a service provider, but rather are determined by the install technician. Hence, there is a need for an improved system and method of configuring a network device.

DETAILED DESCRIPTION OF THE DRAWINGS

In a particular illustrative embodiment, a method of configuring a network device is disclosed that includes determining network device information at a network device using a boot strapping protocol during an initial set-up process of the network device. The method further includes automatically modifying a configuration profile of the network device to connect to a network in a first device mode using the network device information. The method also includes receiving configuration information transmitted from a configuration server without requesting the configuration information. The configuration information includes routing information and configuration parameters particular to the network device. The method further includes automatically modifying the configuration profile of the network device to operate in a second device mode based on the configuration information. The first device mode is a non-operational mode and the second device mode is an operational mode.

In another particular illustrative embodiment, a system to configure network devices is disclosed that includes a network interface coupled to a network and processing logic coupled to the network interface. The processing logic determines one or more network devices to be configured and dynamically assembles a configuration profile for each respective network device of the one or more network devices. The processing logic schedules configuration of the one or more network devices and transmits the configuration profile to each respective network device via the network based on the scheduled configuration.

In still another particular illustrative embodiment, a method of configuring network devices is disclosed that includes dynamically assembling a configuration profile for each respective network device of one or more network devices to be configured and scheduling configuration of the one or more network devices. The method also includes transmitting the configuration profile to each respective network device via the network based on the scheduled configuration.

In yet another particular illustrative embodiment, a processor readable medium includes instructions executable by a processor to configure a network device. The instructions are executable by the processor to determine one or more network devices to be configured, to dynamically generate a configuration profile for each respective network device of the one or more network devices and to determine a schedule for configuring the one or more network devices. The processor readable medium further includes instructions that are executable by the processor to transmit the configuration profile to each respective network device via the network based on the schedule.

Figure 1:
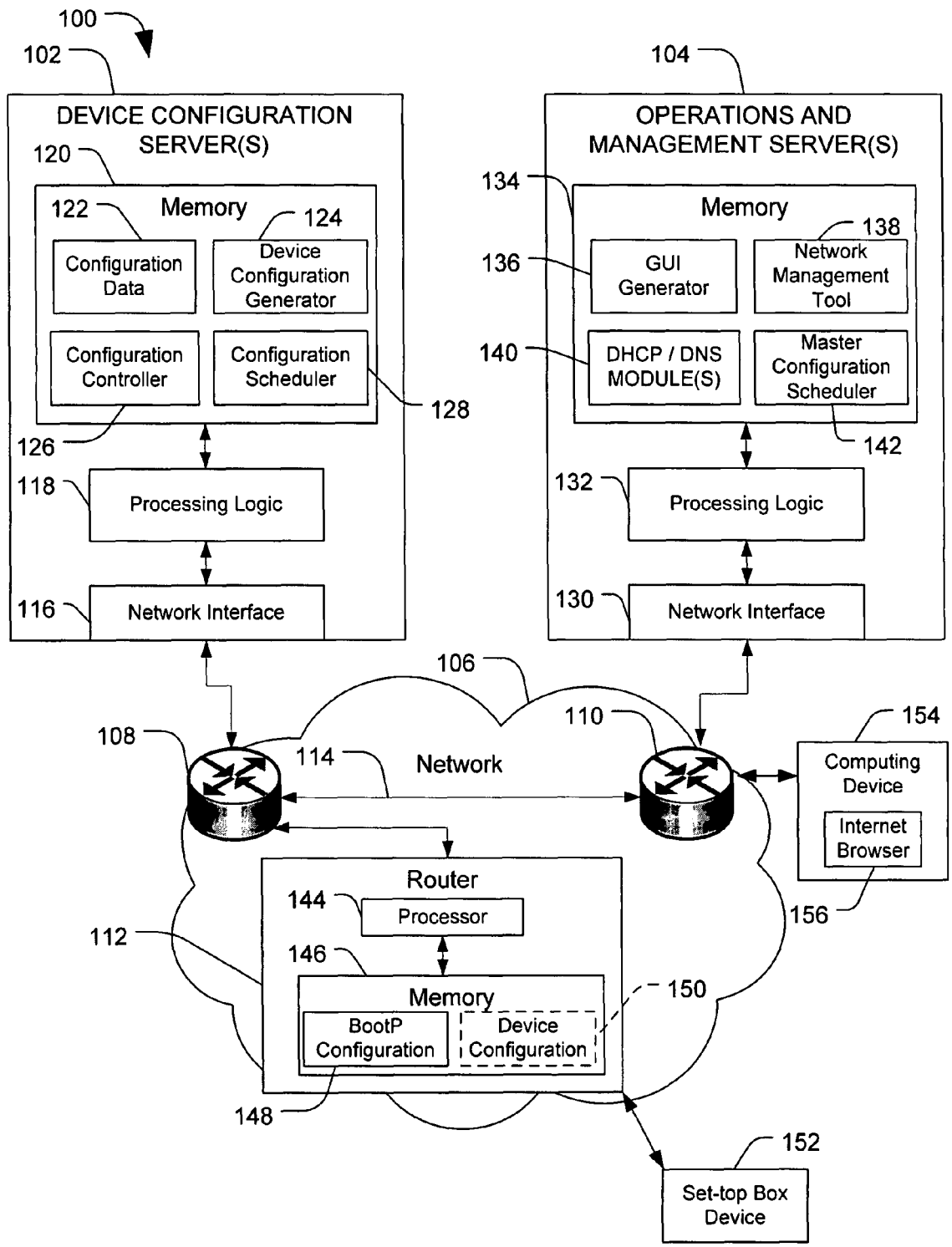
FIG. 1 is a block diagram of a particular illustrative embodiment of a system to configure a network device.

FIG. 1 is a block diagram of a particular illustrative embodiment of a system 100 to configure a network device. The system 100 includes one or more device configurations servers 102 that can communicate with one or more operations and management servers 104 via a network 106. The network 106 may be an Internet Protocol (IP) network that includes multiple network devices, such as the routers 108, 110, and 112. The routers 108 and 110 may communicate to route data between the one or more device configuration servers 102 and the one or more operations and management servers 104 via a logical communication channel, such as the communication channel 114.

The one or more device configuration servers 102 include a network interface 116 that can communicate with the network 106. The one or more device configuration servers 102 also include processing logic 118 and memory 120 that is accessible to the processing logic 118. The memory 120 may include device configuration data 122, a device configuration generator 124, a configuration controller 126, and a configuration scheduler 128. The device configuration generator 124 may be executed by the processing logic 118 to assemble a device configuration for a particular network device associated with network 106. In a particular illustrative embodiment, the device configuration generator 124 may assemble configuration parameters for each network device based on its IP address. For example, the device configuration generator 124 may identify a domain and subnet domain based on the IP address of a particular network device. Additionally, the device configuration generator 124 may identify a device type and other information related to the network device and may assemble a configuration profile for the particular network device based on the IP address, the domain information, the device type, and other information. The configuration profile may include information related to a domain associated with the network device as well as device specific parameters. The configuration scheduler 128 may be executed by the processing logic 118 to schedule transmission of the generated configuration profile to each particular network device. The configuration controller 126 may be executed by the processing logic 118 to execute the scheduled transmission of the configuration profile to the particular network device.

The one or more operations and management servers 104 include a network interface 130 that can communicate with the network 106. The one or more operation and management servers 104 may also include processing logic 132 and memory 134 that is accessible to the processing logic 132. The memory 134 includes a graphical user interface (GUI) generator 136 that can be executed by the processing logic 132 to generate a graphical user interface, such as an Internet browser window that can be rendered in an Internet browser application at a remote device. The memory 134 also includes a network management tool 138 that is executable by the processing logic 132 to generate an interface for use in managing a variety of network resources, including routers, switches, servers, and other devices. The memory 134 also includes a dynamic host configuration protocol (DHCP)/domain names service (DNS) module 140 that is executable by the processing logic to assign Internet protocol addresses to devices on the network 106. The DHCP/DNS module 140 is also executable by the processing logic 132 to provide device name information to various network devices. The memory 134 also includes a master configuration scheduler 142 that is executable by the processing logic 132 to schedule configuration of various network devices associated with the network 106. The master configuration scheduler 142 may generate schedule data that can be communicated to the configuration scheduler 128 of the one or more device configuration servers 102 to coordinate a configuration schedule for the network devices.

The router 112 includes a processor 144 and memory 146 that is accessible to the processor 144. The memory 146 includes a boot strap protocol (BOOTP) configuration 148 that is executable by the processor when the router 112 is powered up. The router 112 can install the BOOTP configuration 148 and use the BOOTP configuration 148 to establish a connection to other routers, such as the routers 108 and 110 associated with the network 108. The BOOTP configuration 148 may allow the router 112 to retrieve an IP address and optionally a device name from the one or more operations and management servers 104, such as from the DHCP/DNS module 140. The BOOTP configuration 148 may be utilized by the router 112 to operate in a first device mode. In the first device mode, the router 112 does not route packets.

The router 112 may receive a configuration profile from the one or more device configuration servers 102. The router 112 may store the received configuration profile in the memory 146 as a device configuration 150. The router 112 is adapted to install the device configuration 150 and to acknowledge success or failure of the installation to the one or more device configuration servers 102. When the device configuration 150 is successfully installed, the router 112 may enter a second device mode. In the second device mode, the router 112 can route IP packets including media content.

In a particular illustrative embodiment, the router 112 may be connected to the router 108. When the router 112 is powered up, the processor 144 accesses the BOOTP configuration 148 within the memory 146. The processor 144 installs the BOOTP configuration 148 to enter the first device mode. The router 112 may communicate with the one or more operations and management servers 104 via the router 108, the logical communication path 114, and the router 110. The router 112 communicates with the one or more operations and management servers 104 to retrieve an IP address. In a particular illustrative embodiment, the router 112 may also retrieve a device name from the DHCP/DNS module 140 of the operations and management server 104. The router 112 may utilize the Internet protocol address to connect to other router devices and/or switches associated with the network 106. However, the router 112, at this point, is operating in a first operational mode.

In a first operational mode, the router 112 does not route media content traffic. The router 112 can receive device configuration data from the one or more device configuration servers 102 via the router 108. Upon receipt of the device configuration data, the router 112 may execute the device configuration data and store the device configuration data in the memory at device configuration 150. At this point, the router 112 can enter a second operational mode, which allows the router 112 to route media content via other devices associated with the network 106. In a particular illustrative embodiment, the router 112 may route data to one or more customer premises equipment devices, such as a set top box device 152 located at a customer premises. In this example, the operations and management servers 104 and the one or more device configuration servers 102 may schedule installation of the device configuration data at the router 112, such that the router 112 receives the device configuration data, installs the configuration data, and becomes active at a scheduled time. Once active, the router 112 may route media content to the set-top box device 152, for example. In a particular illustrative embodiment, the set-top box device 152 may be a television signal decoder that is coupled to a display device. In another particular illustrative embodiment, the set-top box device 152 may be a computing device, such as a personal computer, a personal digital assistant (PDA), a mobile phone with media processing capabilities, or any combination thereof.

The one or more operations and management servers 104 may be accessible to a user via a computing device 154 that includes an Internet browser 156 via the network 106. In a particular illustrative embodiment, the network 106 may be a public access network, such as the Internet. In another particular illustrative embodiment, the network 106 may be a private access network, such as a Internet protocol television network. In an alternative embodiment, the network 106 may be a private access network and the computing device 154 may communicate with the one or more operations and management servers 104 via a public network, such as the Internet.

The computing device 154 may execute the Internet browser 156 and access a web page accessible via the one or more operations and management servers 104. The operations and management server 104 may receive a request for the web page content, and the processing logic 132 may execute the graphical user interface generator 136 to produce a graphical user interface. The one or more operations and management servers 104 may provide the generated graphical user interface to the computing device 154 via the network 106. The graphical user interface may include information related to one or more network devices 108, 110, and 112, including configuration data, schedule information, other information or any combination thereof. A user may interact with the graphical user interface via the computing device 154 and the Internet Browser 156 to schedule configuration of a particular network device, such as the router 112. The one or more operations and management servers 104 may communicate such schedule information to the one or more device configurations servers 102.

In a particular illustrative embodiment, the configuration scheduler 128 may receive scheduling data from the operations and management servers 104, such as scheduling data received from user interactions with the graphical user interface. The scheduling data may include a list of devices and their respective IP addresses. The list of devices may identify network devices to be configured. The device configuration generator 124 may utilize the Internet protocol address to determine common device configuration parameters that the router 112 may share with other network devices and to identify unique parameters that are intended for each particular network device. The device configuration generator 124 may assemble the specific device configurations for each of the network devices to be configured. The configuration controller 126 may transmit the generated device configuration data to each of the network devices to be configured, such as the router 112. The processing logic 118 can schedule the configuration of each of the one or more network devices. The configuration controller 126 may be utilized to send the configuration profile to each respective network device via the network 106 based on the schedule.

In a particular illustrative embodiment, when the router 112 receives the configuration data, the router 112 installs the configuration data in the memory 146 as the device configuration 150. The router 112 may install the device configuration data to transition from the first device mode (non-routing mode) to a second device mode (routing mode), where the second operational mode includes operations such a media content routing and other operational functions.

In a particular illustrative embodiment, the scheduling of the configuration of each network device may be independent of the scheduling for other network devices. Additionally, the processing logic 118 may be adapted to verify the configuration installation at each network device associated with the network 106. For example, the processing logic 118 may verify the installation of the device configuration data at the router 112 and at other network devices associated with the network 106. The verification information may be utilized to generate alerts and/or other feedback to the one or more operations and management servers 104, to allow a network operator to manage the installation and operation of the multiple network devices. For example, if a particular installation fails, a work order or other service request may be generated to dispatch a technician to fix the particular network device.

Figure 2:
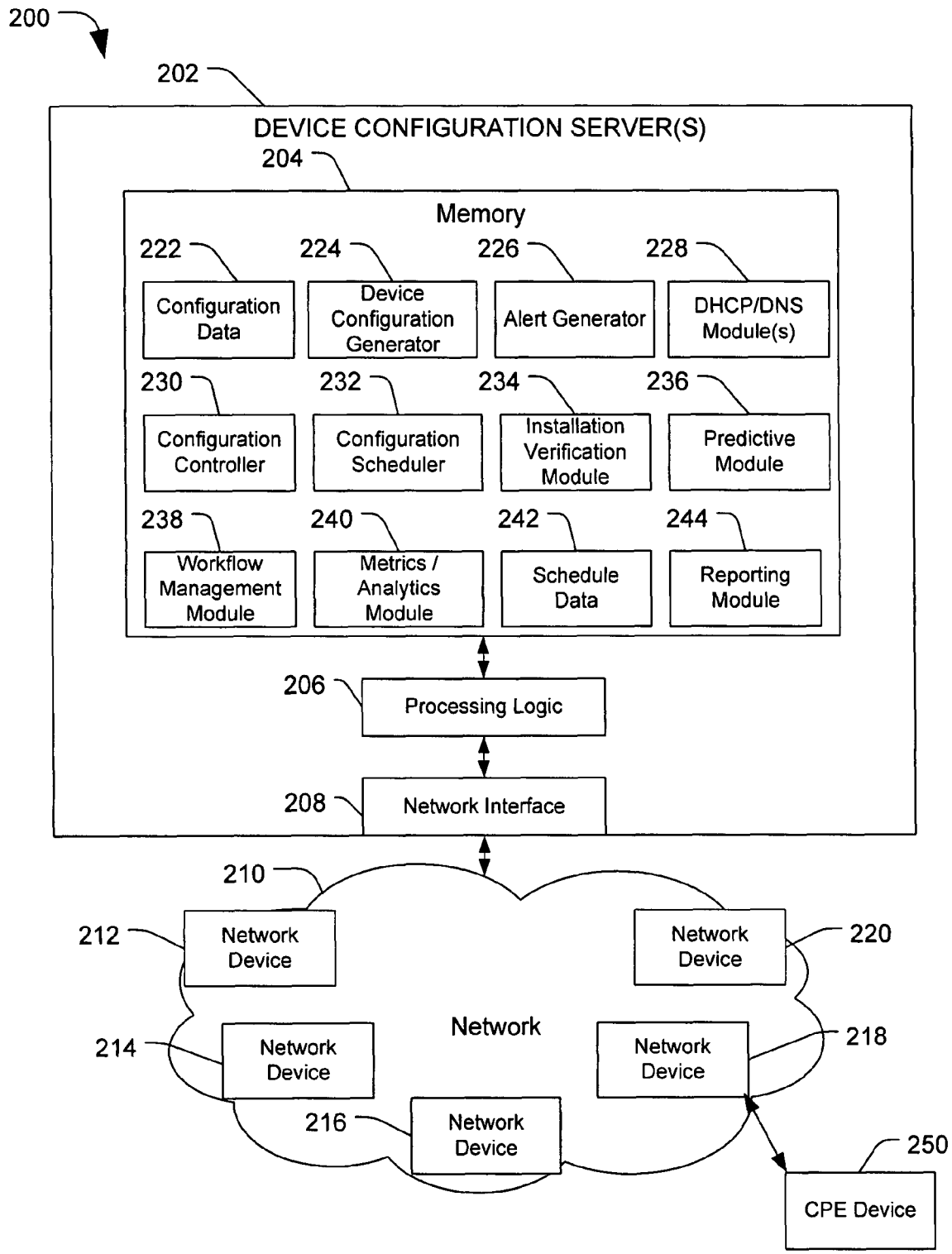
FIG. 2 is a block diagram of a second particular illustrative embodiment of a system to configure a network device.

FIG. 2 is a block diagram of a second particular illustrative embodiment of a system 200 to configure a network device. The system 200 includes one or more device configuration servers 202, which includes memory 204, processing logic 206 having access to the memory 204, and a network interface 208 that communicates with one or more network devices 212, 214, 216, 218 and 220 via a network 210. The memory 204 may include configuration data 222 related to various network devices, such as the network device 212. The memory 204 may also include schedule data 242 that is related to the scheduling of configurations of one or more network devices, such as the network device 212. The one or more device configuration servers 202 include a device configuration generator 224 that is executable by the processing logic 206 to generate a unique device configuration for each network device that is coupled to the network 210.

The memory 204 also includes a configuration controller 230 and a configuration scheduler 232 that are executable by the processing logic 206 to determine a configuration schedule for one or more network devices and to initiate the transmission of configuration data to each network device according to the configuration schedule. The memory 204 also includes an installation verification module 234 that is executable by the processing logic 206 to verify the installation of device configuration data at each network device. The alert generator 226 may be executed by the processing logic 206 to generate an alert to one or more operations and management servers, such as the operations and management server 104 in FIG. 1, when the installation verification module 134 determines that there was an error or other failure of the configuration data installation at a particular network device. The memory 204 also includes a dynamic host configuration protocol (DHCP)/domain name service (DNS) module 228 that is executable by the processing logic 206 to provide Internet Protocol (IP) addresses and domain name information to authorized devices associated with the network 210, such as the one or more network devices.

The memory 204 also includes a workflow management module 238 that is executable by the processing logic 206 to generate workflow information and to provide a workflow management interface, which may be accessed to create work orders, open service tickets, and otherwise schedule technical support for a variety of network devices and systems. The workflow management interface may be accessible via an Internet browser operating on a computing device, such as the computing device 154 in FIG. 1.

The memory 204 may also include a predictive module 236 that may be utilized to estimate installation dates and usage requirements for the network 210. In a particular illustrative embodiment, the predictive module 236 may be executed by the processing logic 206 to estimate the number of routing devices and switches, such as the network devices 212, 214, 216, 218 and 220 that may be required for routing media content to a variety of remote devices via the network 210. The predictive module 236 may project usage trends and network bandwidth requirements in the future based on historical data, for example.

In a particular embodiment, the network 210 may be comprised of a plurality of network devices, such as the network devices 212, 214, 216, 218, and 220. In a particular illustrative embodiment, the one or more device configuration servers 202 may push configuration data (such as a device specific configuration profile) to a particular network device, such as the network device 218. The one or more device configuration servers 202 may transmit the configuration data to a particular IP address that is associated with the network device 218. In a particular illustrative embodiment, the one or more device configuration servers 202 may transmit the configuration data to the network device 218 at a scheduled time.

The memory 204 may also include a metric/analytics module 240 that is executable by the processing logic 206 to calculate a variety of metrics associated with the workflow and the installation of various network devices. In particular, the metrics and analytics modules may generate reports that can be utilized by the reporting module 244 to provide insight into the progress of network installation and the servicing and updating of various network modules.

In a particular illustrative embodiment, the one or more device configuration servers 202 may be adapted to configure specific network devices, such as the network device 218. In a particular embodiment, the one or more device configurations servers 202 may utilize the device configuration generator 224 to generate a device configuration for installation at the network device 218. At a scheduled time, the configuration controller 230 and the configuration scheduler 232 may cooperate to transmit or send the generated device configuration data to the network device 218.

The installation verification module 234 may communicate with the network device 218 to confirm successful installation at the network device 218. If the installation fails, the installation verification module 234 may trigger an alert generated by an alert generator 226, which the one or more device configuration servers 202 may communicate to an operations and management system. The alert may cause the operations and management system to create a work order or other service ticket to dispatch a service technician to fix the network device 218. If the installation is successful, the schedule data 242 may be updated, and configuration information may also be updated in the configuration data 222. The one or more device configuration servers 202 may be adapted to communicate with operations and management system to provide workflow information to an enterprise system. Additionally, the workflow management module 238 may be adapted to generate tickets and other work orders for the installation and configuration of various network elements.

In a particular illustrative embodiment, a particular network device, such as the network device 218, may be connected to the network 210. Upon power up, the network device 218 communicates with the one or more device configurations servers 202 to retrieve an IP address and optionally a device name from a DHCP/DNS module 228 that is operating at the one or more device configuration servers 202. The network device 218 may utilize the received IP address and device name to communicate with other network devices, such as the network device 212, 214, 216, and 220 associated with the network 210. The network device 218 may operate in a first operational mode, which does not allow the network device 218 to route media content. Subsequently, the network device 218 may receive a generated device configuration from the one or more devices configurations servers 202. The network device 218 may install the device configuration data and communicate with the device configuration servers 202 to notify the device configuration servers 202 of a successful device configuration installation. After installation, the network device 218 may operate in a second operational mode, which allows the network device 218 to route media content to the CPE device 250, for example.

Figure 3:
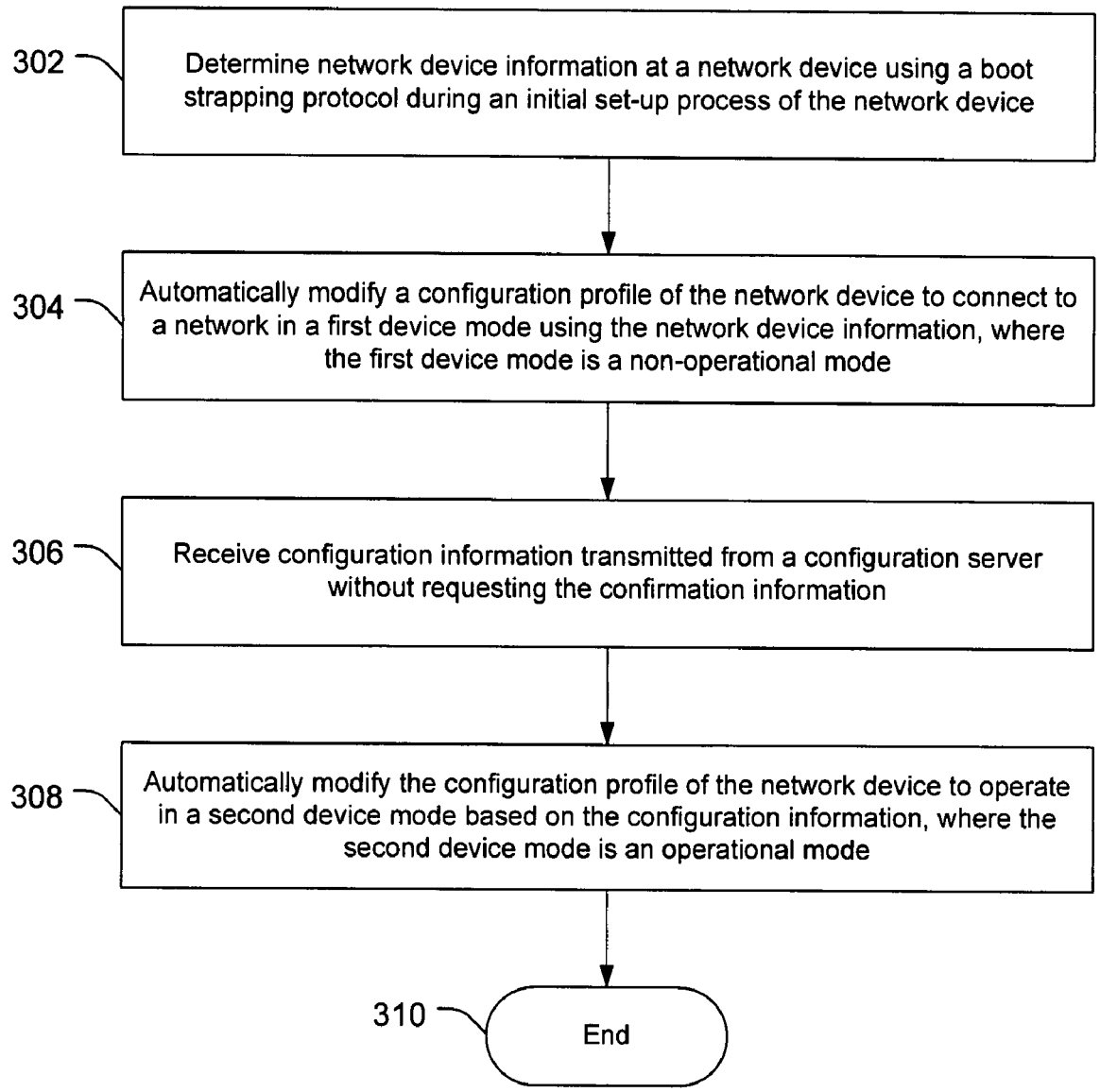
FIG. 3 is a flow chart of a particular illustrative embodiment of a method of configuring a network device.

FIG. 3 is a flow chart of a particular illustrative embodiment of a method of configuring a network device. At 302, the network device information is determined at a network device using a boot strapping protocol during an initial set up process of the network device. For example, the network device may execute a boot protocol (BOOTP) that may include instructions for connecting to a network. Proceeding to 304, a configuration profile of the network device is automatically modified to connect to the network in a first device mode using the network device information, where the first device mode is a non-operational mode. The modification of the configuration profile may include installing configuration data from the BOOTP configuration. In a particular illustrative embodiment, in the first device mode, the network device may not route media content.

Moving to 306, configuration information is received that was transmitted from a configuration server without requesting the confirmation information. For example, the configuration server may transmit configuration information that is specific to the network device at a scheduled time. Advancing to 308, the configuration profile of the network device is automatically modified based on the configuration information to operate in a second device mode, where the second device mode is an operational mode. In a particular illustrative embodiment, the modification of the configuration profile may include installing the configuration information at the network device. In a particular illustrative embodiment, after successful installation, the network device may operate in the second device mode to route media content. The method terminates at 310.

In particular illustrative embodiment, the network device may route media content within an Internet protocol television (IPTV) access network. In another particular illustrative embodiment, the method may include transmitting a message, such as a successful installation message, that is related to modifying the configuration protocol to the configuration server. The message may indicate a status of the installation of the configuration data. The network device information may include an Internet protocol address, a device name, other information or any combination thereof.

Figure 4:
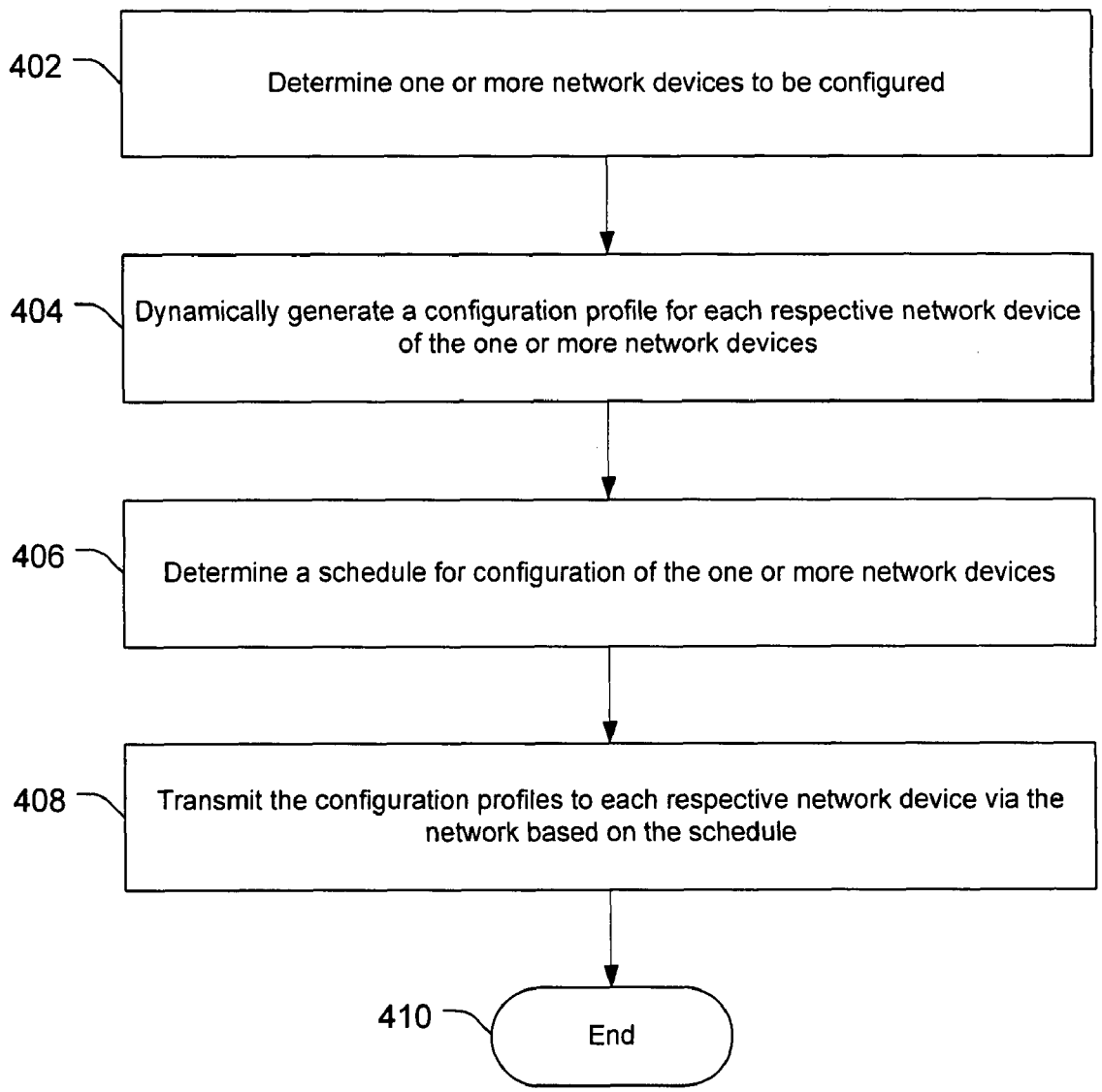
FIG. 4 is a flow chart of a second particular illustrative embodiment of a method of configuring a network device.

FIG. 4 is a flow chart of a second particular embodiment of a method of configuring a network device. At 402, one or more configurations servers determine one or more network devices to be configured. In a particular illustrative embodiment, the determination made by the one or more configurations servers may be based on IP address information received from an operations and management system, for example. The IP address information may identify a list of network devices to be configured and may be derived from IP addresses that are newly assigned to network devices. Such IP addresses may be received from a DHCP/DNS server, from a workflow management tool, or from any combination thereof.

Proceeding to 404, the one or more configuration servers dynamically generate a configuration profile for each respective network device of the one or more network devices. In a particular illustrative embodiment, the one or more configurations servers may utilize IP address and other information associated with the one or more network devices to determine common configuration parameters and unique configuration parameters for each of the one or more network devices. Advancing to 406, the one or more configurations servers determine a schedule for configuration of the one or more network devices. In a particular illustrative embodiment, each of the one or more network devices may be independently scheduled for configuration. In a first particular example, a first network device of the one or more network devices may be scheduled for configuration at a first time and a second network device of the one or more network devices may be scheduled for configuration at a second time. In another particular illustrative embodiment, the schedule may be determined from data received via a graphical user interface.

Continuing to 408, the one or more configurations servers send the configuration profiles for each respective network device via the network based on the determined schedule. In a particular illustrative embodiment, the configuration profiles may be sent at different times according to the schedule. In a particular illustrative embodiment, the scheduling of the transmission of the configuration profiles may be used to schedule the activation of network elements, allowing the one or more configuration servers to control the activation of a portion of the network. The method terminates at 410.

In a particular embodiment, the one or more configuration servers may dynamically assign an Internet protocol (IP) address to each of the one or more network devices. For example, the one or more configurations servers may receive a dynamic host configuration protocol (DHCP) request from the one or more network devices. Additionally, the one or more configuration servers may assemble a list of the IP addresses for the one or more network devices, would list represents the one or more network devices to be configured. In an illustrative embodiment, the DHCP request may be received by a DHCP server that is separate from the one or more configuration servers. The DHCP server may provide a list IP addresses to the one or more configuration servers.

In one embodiment, the configuration profile can be transmitted without receiving a request from the one or more network devices. For example, the configuration profile may be automatically transmitted based on receiving the list of IP addresses. In another particular embodiment, the transmission of the configuration profiles may be controlled according to a schedule.

The one or more configurations servers may receive data related from a schedule input from a scheduling system. The schedule data can identify a date and time to initiate operation of at least one of the one or more network devices. A network device initiates operation by installing a device configuration and routing media content. The one or more configurations servers may store the schedule data in a memory. The schedule data may include target dates for configuring at least one of the one or more network devices to route the media content. In a particular illustrative embodiment, the one or more configuration servers may push or otherwise send the configuration of profile data to a particular network device without receiving a request for the configuration data. Additionally, the configuration data may be routed to the network device based on the IP address associated with the network device.

Figure 5:
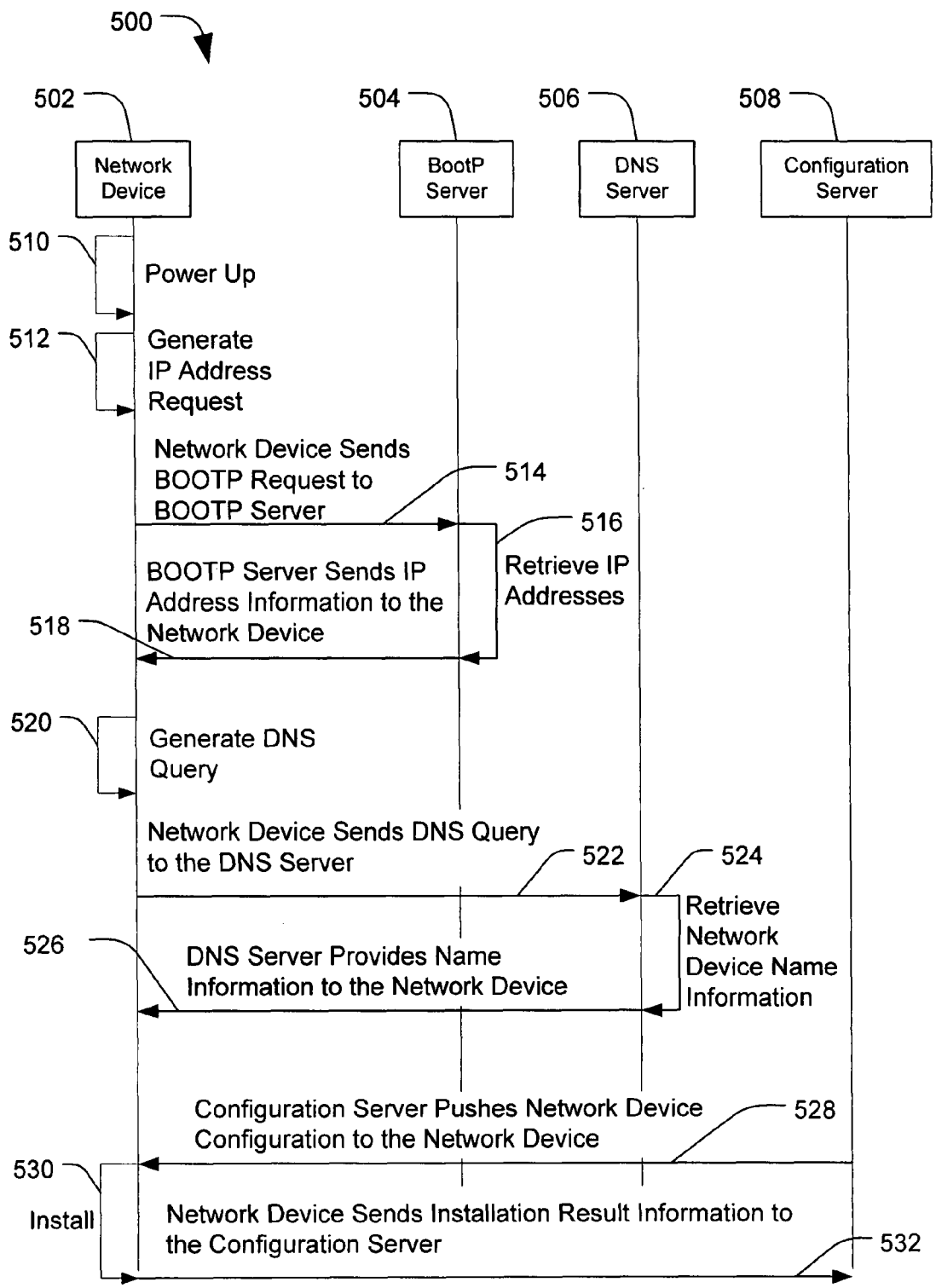
FIG. 5 is a ladder diagram of a particular illustrative embodiment of a method of configuring a network device.

FIG. 5 is a ladder diagram 500 of a particular illustrative embodiment of a method of configuring a network device. The ladder diagram 500 includes a network device 502, a boot protocol (BOOTP) server 504, a domain name server (DNS) 506, and a configuration server 508. At 510, the network device 502 powers up. The power up sequence of the particular network device 502 may include generating an IP address request at 512. Proceeding to 514, the network device 502 sends a boot strap protocol (BOOTP) request to the BOOTP server. In a particular illustrative embodiment, the BOOTP request may include an Internet protocol address request, a domain name request, or other requests, or any combination thereof. At 516, the BOOTP server 504 retrieves an IP address. In a particular illustrative embodiment, the BOOTP server 504, the DNS 506, and the configuration server 508 may be services that are provided via software modules executed by a single server. In another particular illustrative embodiment, the BOOTP server 504 and the DNS 506 may be combined in a single server, and the configuration server 508 may be a separate server device.

Moving to 518, the BOOTP server 504 transmits the IP address information to the network device 502. The network device 502 may install or otherwise configure its Internet protocol parameters to include the IP address information. At 520, the network device 502 may generate a domain name server (DNS) query. In a particular illustrative embodiment, the network device 502 may generate a DNS query that requests a name associated with the network device 502. At 522, the network device sends the DNS query to the DNS 506. Proceeding to 524, the DNS 506 retrieves name information. Advancing to 526, the DNS 506 sends the name information to the network device 502.

Proceeding to 528, the configuration server 508 pushes network device configuration data to the network device 502. In a particular illustrative embodiment, the configuration server 508 may send or push the network device configuration data to the network device 502 at a scheduled time. Additionally, the configuration server 508 may transmit the network device configuration information to the network device without receiving a request for such configuration data from the network device. The network device 502 installs the network device configuration, at 530. Proceeding to 532, the network device sends installation result information to the configuration server 508.

Figure 6:
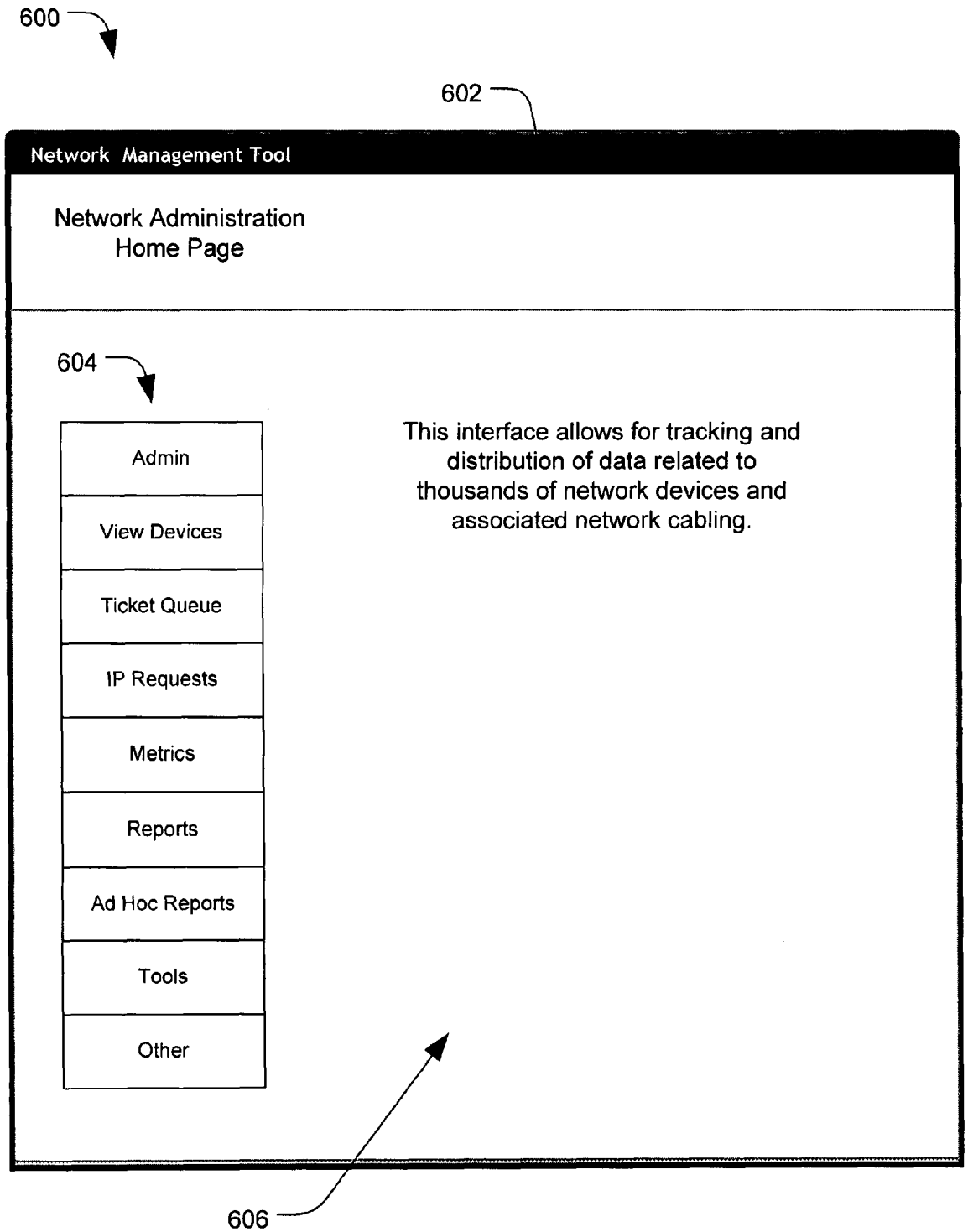
FIG. 6 is a block diagram of a particular illustrative embodiment of a graphical user interface to configure a network device.

FIG. 6 is a block diagram of a particular illustrative embodiment of a graphical user interface (GUI) 600 to configure a network device. The interface 600 includes a window 602 that may be associated with a network management tool. The window 602 includes a plurality of user selectable indicators, such as buttons 604, which may be selected to access various aspects of the network management tool. The window 602 may also include an information panel 606 that may display data based on user selection of one or more of the user selectable indicators 604. The user selectable indicators 604 may include an "Admin" button, a "View devices" button, a "Ticket queue" button, and "IP request" button, a "Metrics" button, a "Reports" button, an "Ad hoc reports" button, a "Tools" button, and an "Other" button, or any combination thereof.

In a particular illustrative embodiment, selection of the Admin button may cause the GUI 600 to communicate with a server to retrieve administration information and options and to render the retrieved information and options for display. In another particular illustrative embodiment, the View devices button may cause the GUI 600 to display a graphical map or list of network devices. The Ticket queue button may access a list of service tickets or technician dispatch orders related to various network devices. The Ticket queue button may also be accessed to schedule a work order. The IP request button may be accessed to service a request for an IP address. For example, when a new customer or subscriber is added that requires a fixed IP address, the IP request button may be accessed to assign an IP address to the particular customer.

The Metrics button may be selected to access a window that includes related to the installation of network devices including installation projections. The Reports button and the Ad Hoc Reports button may be selected to access various reports. The Tools button may be selected to access various administrative functions, including adding users and other administrative functions. Additionally, other buttons may be provided to access various functions of a network management software tool.

Figure 7:
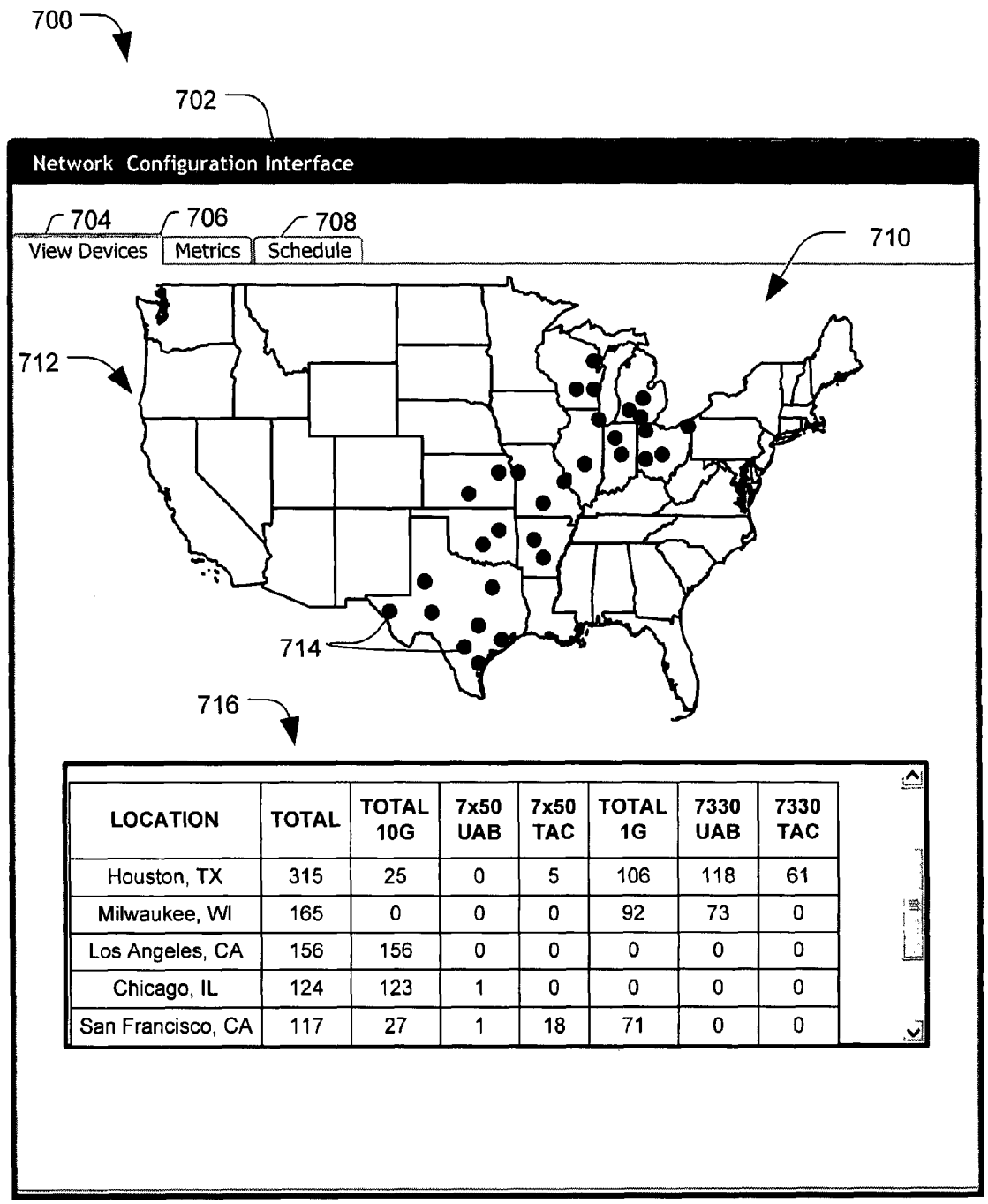
FIG. 7 is a block diagram of a second particular illustrative embodiment of a graphical user interface to configure a network device.

FIG. 7 is a block diagram of a second particular illustrative embodiment of a graphical user interface 700 to configure a network device. The graphical user interface 700 includes a window 702. The window 702 may be associated with a network management software tool. The window 702 includes a "View Devices" tab 704, a "Metrics" tab 706, and "Schedule" tab 708. The View Devices tab 704 is selected. The window 702 also includes a display panel 710 that is associated with the View Devices tab 704. The display panel 710 includes a map 712 having a plurality of elements 714 distributed on the map that represent geographic locations associated with network devices. The window 702 also includes a table 716 associated with the network devices. The table 716 may include location information, total number of network devices at each location, information about specific types of network devices, other information, or any combination thereof.

Figure 8:
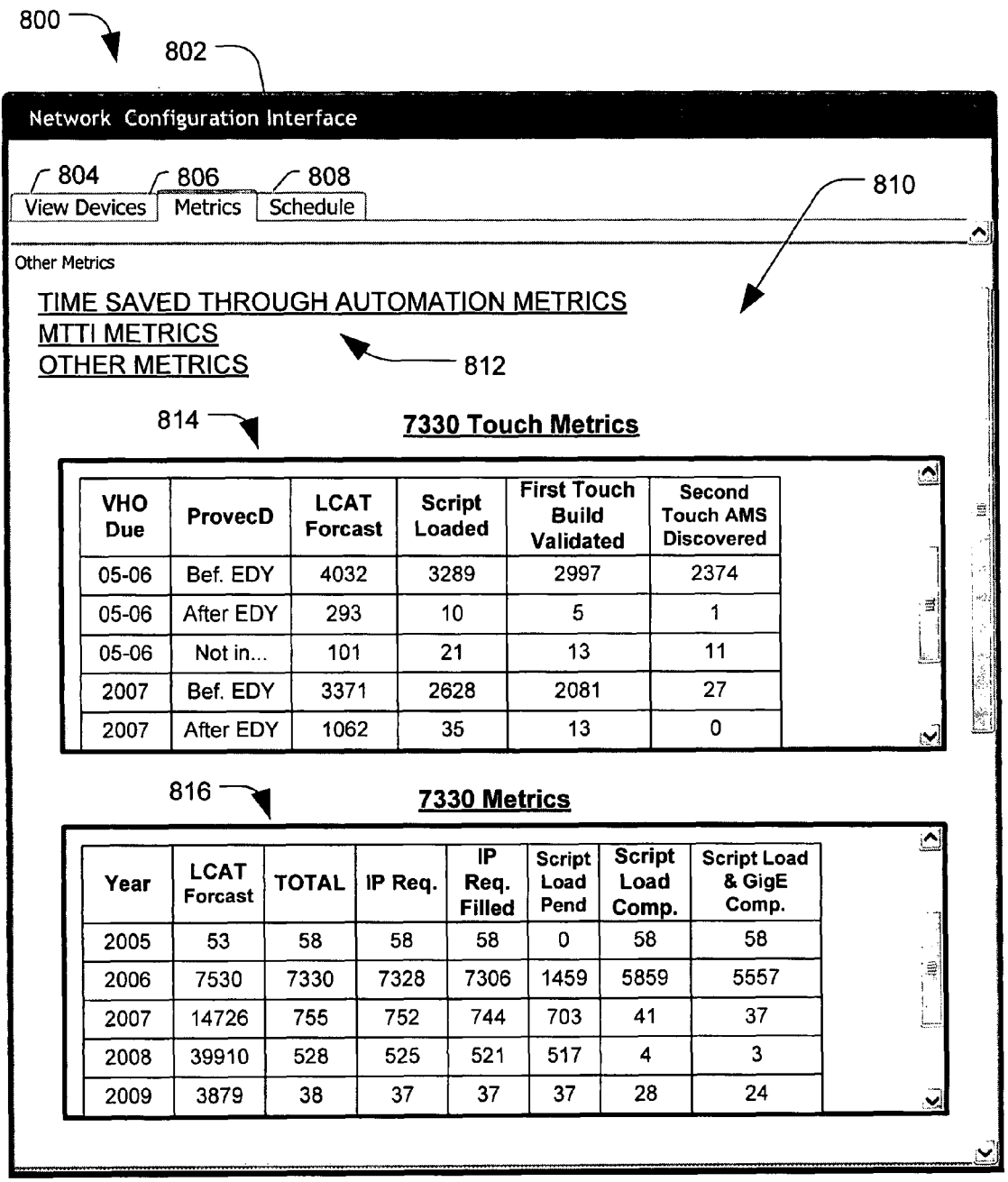
FIG. 8 is a block diagram of a third particular illustrative embodiment of a graphical user interface to configure a network device.

FIG. 8 is a block diagram of a third particular illustrative embodiment of a graphical user interface (GUI) 800 to configure a network device. The GUI 800 includes a window 802 that may be associated with a network configuration interface that relates to a network management tool. The window 802 includes a "View Devices" tab 804, a "Metrics" tab 806, and a "Schedule" tab 808. The Metrics tab 806 is selected, which causes the GUI 800 to display a metrics panel 810. The metrics panel 810 includes links 812 that may be selected to access a variety of metrics. The links 812 may include "time saved through automation metrics" link, a device specific metrics link (e.g., a "MTTI metrics" link), an "other metrics" link, or any combination thereof. Additionally, the metrics panel 810 may include a table 814 that is associated with a particular network device, such as a "7330 touch" device. The other metrics tab 810 may also include a table 816 that is associated with a second device, such as the "7330" device.

The graphical user interface as illustrated in FIGS. 6 through 8 may be accessed using an Internet browser, such as Internet explorer, or another Internet browser. The user interfaces may be utilized to access an administrative menu for scheduling installation. Additionally, the metrics tab allows the aids the operator at the network to view a variety of devices and the status of a particular installation as shown in tables 814 and 816 in FIG. 8. The status of the particular installation may represent a particular forecast installation as well as the actual total installs. Further, the tables 814 and 816 may include data related to projected installations and their relative progress. In a particular illustrative embodiment, a software tool may be provided that includes a metrics/analytics module to evaluate such data and to provide reports, which may be utilized by a network operator to evaluate the state of the particular network devices and installations.

Figure 9:
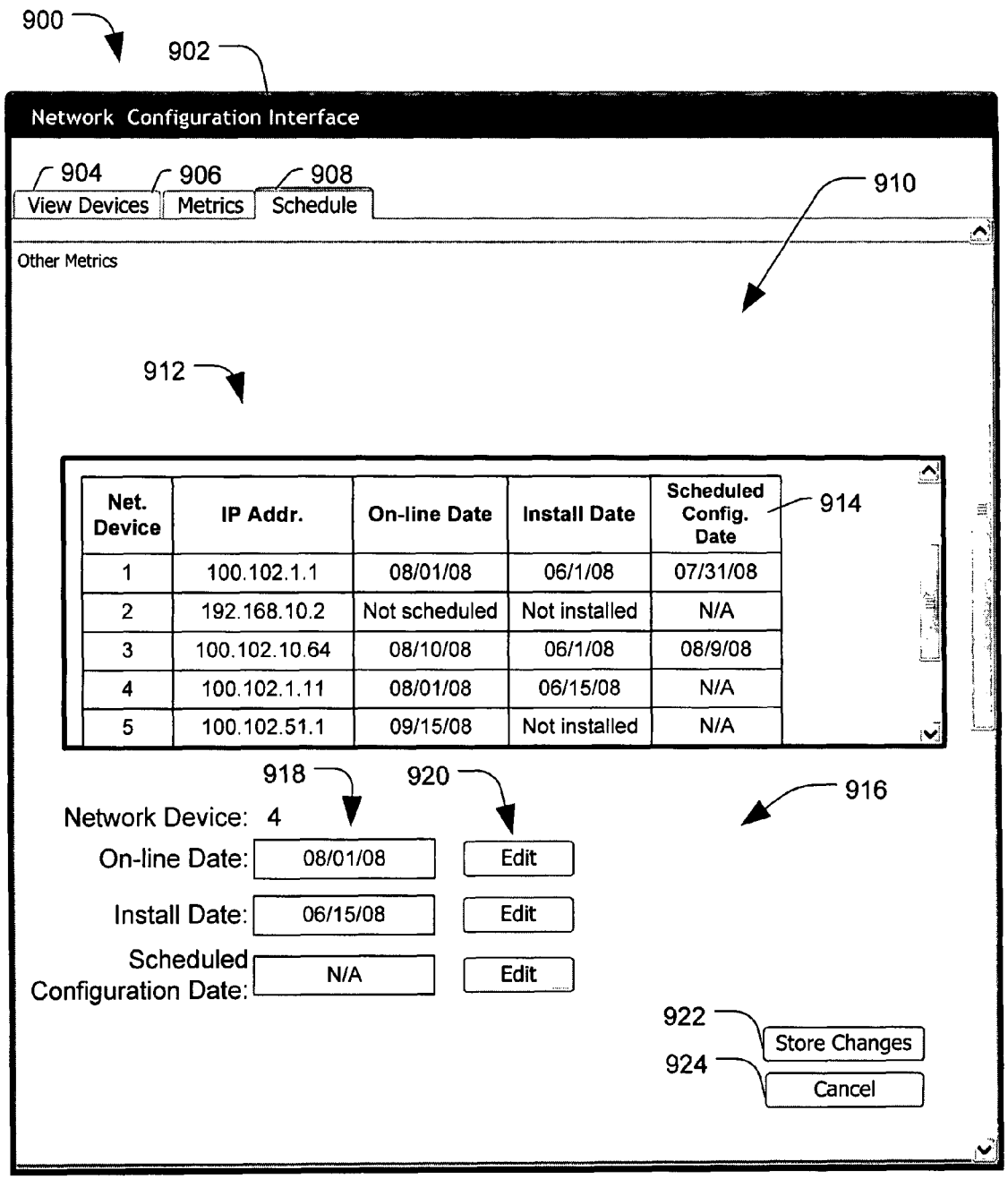
FIG. 9 is a block diagram of a fourth particular illustrative embodiment of a graphical user interface to configure a network device.

FIG. 9 is a block diagram of a fourth particular illustrative embodiment of a graphical user interface (GUI) 900 to configure a network device. The GUI 900 includes a window 902 that has a "View Devices" tab 904, a "Metrics" tab 906, and a "Schedule" tab 908. The tabs 904, 906, and 908 are selectable by a user to access information and functionality of the network configurations software tool. The Schedule tab 908 is selected.

The window 902 includes a schedule panel 910 that includes a table 912 of network devices and associated schedule related information. Each row within the table 912 may be selected to access and alter the schedule information. Additionally, the heading for each column may be selected to reorder the network devices within the table 912. For example, if a user selects a "scheduled configuration date" header 914, the table may be sorted by the scheduled configuration date, in ascending or descending order. One or more network devices may be selected from the table 912 for editing the schedule information. In this instance, the network device 4 is selected.

The schedule panel 910 also includes information 916 related to the selected network device (i.e., network device number 4). In this instance, the date information 918 and the associated edit buttons 920 allow a user to access and change the scheduled date information. If multiple network devices are selected, each device may be separately scheduled or multiple devices may be scheduled with the same date information. Once the changes are made, the changes may be stored by selecting a "Store Changes" button 922 or canceled by selecting a "Cancel" button 924.

The GUI 900 may be accessed via a network using a computing device with an Internet browser application, such as the computing device 154 illustrated in FIG. 1. The schedule information may be provided to one or more configuration servers to schedule configuration of one or more network devices.

In conjunction with the configuration of structure described herein, the systems, methods, and associated graphical user interfaces (GUIs) disclosed include a network device configuration system that determines network devices to be configured, automatically generates a network device configuration profile for each respective network device, schedules the configuration, and sends the configuration profile to the respective network device according to the schedule. The system includes a graphical user interface generator to generate a graphical user interface that may be accessed via the network to manage the configuration schedule, to view metrics associated with network devices, to view network information, or any combination thereof. By utilizing a configuration server and a schedule to coordinate the configuration of selected network devices, the network devices may be installed at any time and brought on-line to route media content according to a schedule by providing the configuration profile, including routing protocols, security information, and other network information based on a schedule.

Figure 10:
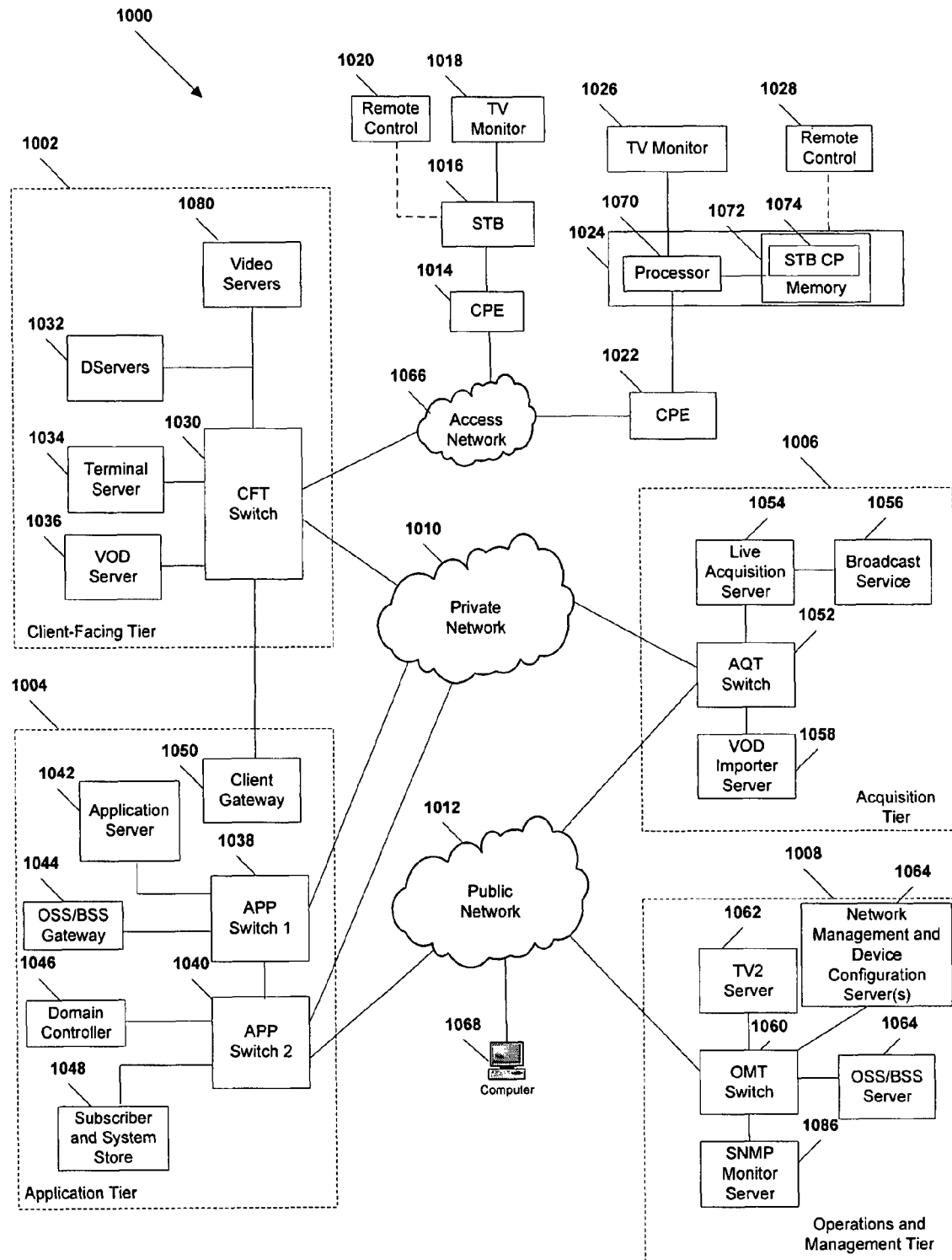
FIG. 10 is a block diagram of a particular illustrative embodiment of an Internet Protocol Television system including a system to configure a network device.

Referring to FIG. 10, an illustrative embodiment of an Internet Protocol Television (IPTV) system that route media content using network devices, such as routers and switches, is illustrated and is generally designated 1000. As shown, the system 1000 can include a client facing tier 1002, an application tier 1004, an acquisition tier 1006, and an operations and management tier 1008. Each tier 1002, 1004, 1006, 1008 is coupled to a private network 1010; to a public network 1012, such as the Internet; or to both the private network 1010 and the public network 1012. For example, the client-facing tier 1002 can be coupled to the private network 1010. Further, the application tier 1004 can be coupled to the private network 1010 and to the public network 1012. The acquisition tier 1006 can also be coupled to the private network 1010 and to the public network 1012. Additionally, the operations and management tier 1008 can be coupled to the public network 1012.

As illustrated in FIG. 10, the various tiers 1002, 1004, 1006, 1008 communicate with each other via the private network 1010 and the public network 1012. For instance, the client-facing tier 1002 can communicate with the application tier 1004 and the acquisition tier 1006 via the private network 1010. The application tier 1004 can communicate with the acquisition tier 1006 via the private network 1010. Further, the application tier 1004 can communicate with the acquisition tier 1006 and the operations and management tier 1008 via the public network 1012. Moreover, the acquisition tier 1006 can communicate with the operations and management tier 1008 via the public network 1012. In a particular embodiment, elements of the application tier 1004, including, but not limited to, a client gateway 1050, can communicate directly with the client-facing tier 1002.

The client-facing tier 1002 can communicate with user equipment via an access network 1066, such as an Internet Protocol Television (IPTV) access network. In an illustrative embodiment, customer premises equipment (CPE) 1014, 1022 can be coupled to a local switch, router, or other device of the access network 1066. The client-facing tier 1002 can communicate with a first representative set-top box device 1016 via the first CPE 1014 and with a second representative set-top box device 1024 via the second CPE 1022. In a particular embodiment, the first representative set-top box device 1016 and the first CPE 1014 can be located at a first customer premise, and the second representative set-top box device 1024 and the second CPE 1022 can be located at a second customer premise. In another particular embodiment, the first representative set-top box device 1016 and the second representative set-top box device 1024 can be located at a single customer premise, both coupled to one of the CPE 1014, 1022. The CPE 1014, 1022 can include routers, local area network devices, modems, such as digital subscriber line (DSL) modems, any other suitable devices for facilitating communication between a set-top box device and the access network 1066, or any combination thereof.

In an exemplary embodiment, the client-facing tier 1002 can be coupled to the CPE 1014, 1022 via fiber optic cables. In another exemplary embodiment, the CPE 1014, 1022 can be digital subscriber line (DSL) modems that are coupled to one or more network nodes via twisted pairs, and the client-facing tier 1002 can be coupled to the network nodes via fiber-optic cables. Each set-top box device 1016, 1024 can process data received via the access network 1066, via an IPTV software platform, such as Microsoft® TV IPTV Edition.

The first set-top box device 1016 can be coupled to a first external display device, such as a first television monitor 1018, and the second set-top box device 1024 can be coupled to a second external display device, such as a second television monitor 1026. Moreover, the first set-top box device 1016 can communicate with a first remote control 1020, and the second set-top box device 1024 can communicate with a second remote control 1028. The set-top box devices 1016, 1024 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 1016, 1024 can receive data, video, or any combination thereof, from the client-facing tier 1002 via the access network 1066 and render or display the data, video, or any combination thereof, at the display device 1018, 1026 to which it is coupled. In an illustrative embodiment, the set-top box devices 1016, 1024 can include tuners that receive and decode television programming signals or packet streams for transmission to the display devices 1018, 1026. Further, the set-top box devices 1016, 1024 can include a STB processor 1070 and a STB memory device 1072 that is accessible to the STB processor 1070. In one embodiment, a computer program, such as the STB computer program 1074, can be embedded within the STB memory device 1072.

In an illustrative embodiment, the client-facing tier 1002 can include a client-facing tier (CFT) switch 1030 that manages communication between the client-facing tier 1002 and the access network 1066 and between the client-facing tier 1002 and the private network 1010. As illustrated, the CFT switch 1030 is coupled to one or more data servers, such as D-servers 1032, that store, format, encode, replicate, or otherwise manipulate or prepare video content for communication from the client-facing tier 1002 to the set-top box devices 1016, 1024. The CFT switch 1030 can also be coupled to a terminal server 1034 that provides terminal devices with a point of connection to the IPTV system 1000 via the client-facing tier 1002. In a particular embodiment, the CFT switch 1030 can be coupled to a video-on-demand (VOD) server 1036 that stores or provides VOD content imported by the IPTV system 1000. Further, the CFT switch 1030 is coupled to one or more video servers 1080 that receive video content and transmit the content to the set-top boxes 1016, 1024 via the access network 1066.

In an illustrative embodiment, the client-facing tier 1002 can communicate with a large number of set-top boxes, such as the representative set-top boxes 1016, 1024, over a wide geographic area, such as a metropolitan area, a viewing area, a statewide area, a regional area, a nationwide area or any other suitable geographic area, market area, or subscriber or customer group that can be supported by networking the client-facing tier 1002 to numerous set-top box devices. In a particular embodiment, the CFT switch 1030, or any portion thereof, can include a multicast router or switch that communicates with multiple set-top box devices via a multicast-enabled network.

As illustrated in FIG. 10, the application tier 1004 can communicate with both the private network 1010 and the public network 1012. The application tier 1004 can include a first application tier (APP) switch 1038 and a second APP switch 1040. In a particular embodiment, the first APP switch 1038 can be coupled to the second APP switch 1040. The first APP switch 1038 can be coupled to an application server 1042 and to an OSS/BSS gateway 1044. In a particular embodiment, the application server 1042 can provide applications to the set-top box devices 1016, 1024 via the access network 1066, which enable the set-top box devices 1016, 1024 to provide functions, such as interactive program guides, video gaming, display, messaging, processing of VOD material and other IPTV content, etc. In an illustrative embodiment, the application server 1042 can provide location information to the set-top box devices 1016, 1024. In a particular embodiment, the OSS/BSS gateway 1044 includes operation systems and support (OSS) data, as well as billing systems and support (BSS) data. In one embodiment, the OSS/BSS gateway 1044 can provide or restrict access to an OSS/BSS server 1064 that stores operations and billing systems data.

The second APP switch 1040 can be coupled to a domain controller 1046 that provides Internet access, for example, to users at their computers 1068 via the public network 1012. For example, the domain controller 1046 can provide remote Internet access to IPTV account information, e-mail, personalized Internet services, or other online services via the public network 1012. In addition, the second APP switch 1040 can be coupled to a subscriber and system store 1048 that includes account information, such as account information that is associated with users who access the IPTV system 1000 via the private network 1010 or the public network 1012. In an illustrative embodiment, the subscriber and system store 1048 can store subscriber or customer data and create subscriber or customer profiles that are associated with IP addresses, stock-keeping unit (SKU) numbers, other identifiers, or any combination thereof, of corresponding set-top box devices 1016, 1024. In another illustrative embodiment, the subscriber and system store can store data associated with capabilities of set-top box devices associated with particular customers.

In a particular embodiment, the application tier 1004 can include a client gateway 1050 that communicates data directly to the client-facing tier 1002. In this embodiment, the client gateway 1050 can be coupled directly to the CFT switch 1030. The client gateway 1050 can provide user access to the private network 1010 and the tiers coupled thereto. In an illustrative embodiment, the set-top box devices 1016, 1024 can access the IPTV system 1000 via the access network 1066, using information received from the client gateway 1050. User devices can access the client gateway 1050 via the access network 1066, and the client gateway 1050 can allow such devices to access the private network 1010 once the devices are authenticated or verified. Similarly, the client gateway 1050 can prevent unauthorized devices, such as hacker computers or stolen set-top box devices from accessing the private network 1010, by denying access to these devices beyond the access network 1066.

For example, when the first representative set-top box device 1016 accesses the client-facing tier 1002 via the access network 1066, the client gateway 1050 can verify subscriber information by communicating with the subscriber and system store 1048 via the private network 1010. Further, the client gateway 1050 can verify billing information and status by communicating with the OSS/BSS gateway 1044 via the private network 1010. In one embodiment, the OSS/BSS gateway 1044 can transmit a query via the public network 1012 to the OSS/BSS server 1064. After the client gateway 1050 confirms subscriber and/or billing information, the client gateway 1050 can allow the set-top box device 1016 to access IPTV content and VOD content at the client-facing tier 1002. If the client gateway 1050 cannot verify subscriber information for the set-top box device 1016, e.g., because it is connected to an unauthorized twisted pair, the client gateway 1050 can block transmissions to and from the set-top box device 1016 beyond the access network 1066.

As indicated in FIG. 10, the acquisition tier 1006 includes an acquisition tier (AQT) switch 1052 that communicates with the private network 1010. The AQT switch 1052 can also communicate with the operations and management tier 1008 via the public network 1012. In a particular embodiment, the AQT switch 1052 can be coupled to a live acquisition server 1054 that receives or acquires television content, movie content, advertisement content, other video content, or any combination thereof, from a broadcast service 1056, such as a satellite acquisition system or satellite head-end office. In a particular embodiment, the live acquisition server 1054 can transmit content to the AQT switch 1052, and the AQT switch 1052 can transmit the content to the CFT switch 1030 via the private network 1010.

In an illustrative embodiment, content can be transmitted to the D-servers 1032, where it can be encoded, formatted, stored, replicated, or otherwise manipulated and prepared for communication from the video server(s) 1080 to the set-top box devices 1016, 1024. The CFT switch 1030 can receive content from the video server(s) 1080 and communicate the content to the CPE 1014, 1022 via the access network 1066. The set-top box devices 1016, 1024 can receive the content via the CPE 1014, 1022, and can transmit the content to the television monitors 1018, 1026. In an illustrative embodiment, video or audio portions of the content can be streamed to the set-top box devices 1016, 1024.

Further, the AQT switch 1052 can be coupled to a video-on-demand importer server 1058 that receives and stores television or movie content received at the acquisition tier 1006 and communicates the stored content to the VOD server 1036 at the client-facing tier 1002 via the private network 1010. Additionally, at the acquisition tier 1006, the video-on-demand (VOD) importer server 1058 can receive content from one or more VOD sources outside the IPTV system 1000, such as movie studios and programmers of non-live content. The VOD importer server 1058 can transmit the VOD content to the AQT switch 1052, and the AQT switch 1052, in turn, can communicate the material to the CFT switch 1030 via the private network 1010. The VOD content can be stored at one or more servers, such as the VOD server 1036.

When users issue requests for VOD content via the set-top box devices 1016, 1024, the requests can be transmitted over the access network 1066 to the VOD server 1036, via the CFT switch 1030. Upon receiving such requests, the VOD server 1036 can retrieve the requested VOD content and transmit the content to the set-top box devices 1016,124 across the access network 1066, via the CFT switch 1030. The set-top box devices 1016, 1024 can transmit the VOD content to the television monitors 1018, 1026. In an illustrative embodiment, video or audio portions of VOD content can be streamed to the set-top box devices 1016, 1024.

FIG. 10 further illustrates that the operations and management tier 1008 can include an operations and management tier (OMT) switch 1060 that conducts communication between the operations and management tier 1008 and the public network 1012. In the embodiment illustrated by FIG. 10, the OMT switch 1060 is coupled to a TV2 server 1062. Additionally, the OMT switch 1060 can be coupled to an OSS/BSS server 1064 and to a simple network management protocol (SNMP) monitor 1086 that monitors network devices within or coupled to the IPTV system 1000. In a particular embodiment, the OMT switch 1060 can communicate with the AQT switch 1052 via the public network 1012. In a particular illustrative embodiment, the OMT switch 1060 may also communicate with one or more network management and device configuration server(s) 1064, which may be used to provide configuration data to one or more network devices within the access network 1066 or the private network 1010.

In an illustrative embodiment, the live acquisition server 1054 can transmit content to the AQT switch 1052, and the AQT switch 1052, in turn, can transmit the content to the OMT switch 1060 via the public network 1012. In this embodiment, the OMT switch 1060 can transmit the content to the TV2 server 1062 for display to users accessing the user interface at the TV2 server 1062. For example, a user can access the TV2 server 1062 using a personal computer 1068 coupled to the public network 1012.

Figure 11:
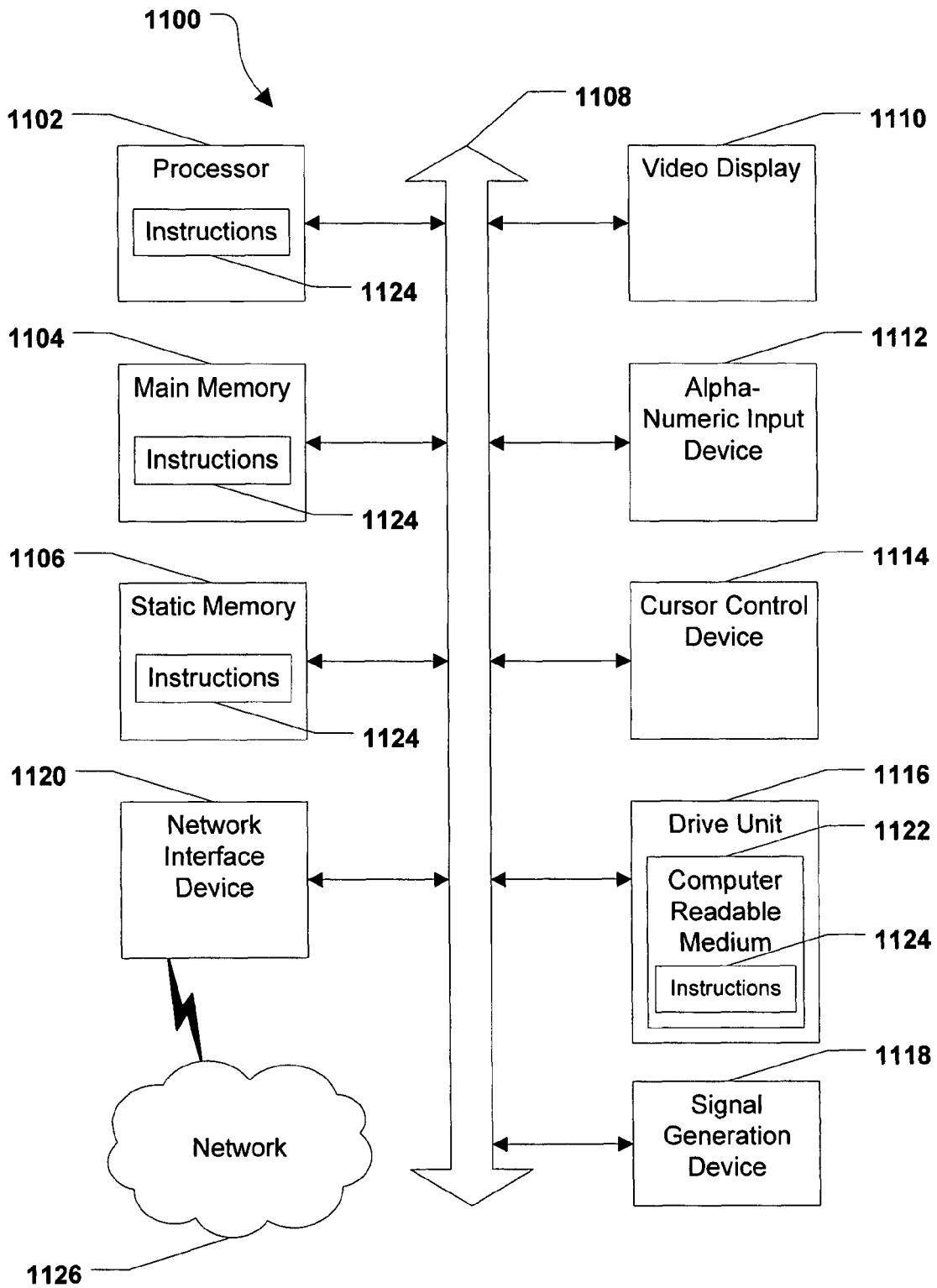
FIG. 11 is a block diagram of a general computing system.

Referring to FIG. 11, an illustrative embodiment of a general computer system is shown and is designated 1100. The computer system 1100 can include a set of instructions that can be executed to cause the computer system 1100 to perform any one or more of the methods or computer based functions disclosed herein. The computer system 1100 may operate as a standalone device or may be connected, e.g., using a network, to other computer systems or peripheral devices. For example, the computer system 1100 may be included in one or more of the servers, network devices, and set-top box devices illustrated in FIGS. 1, 2, and 10.

In a networked deployment, the computer system may operate in the capacity of a server or as a client user computer in a server-client user network environment, or as a peer computer system in a peer-to-peer (or distributed) network environment. The computer system 1100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1100 can be implemented using electronic devices that provide voice, video or data communication. Further, while a single computer system 1100 is illustrated, the term "system" shall also be taken to include any collection of systems or sub-systems that individually or jointly execute a set, or multiple sets, of instructions to perform one or more computer functions.

As illustrated in FIG. 11, the computer system 1100 may include a processor 1102, e.g., a central processing unit (CPU), a graphics processing unit (GPU), or both. Moreover, the computer system 1100 can include a main memory 1104 and a static memory 1106, that can communicate with each other via a bus 1108. As shown, the computer system 1100 may further include a video display unit 110, such as a liquid crystal display (LCD), an organic light emitting diode (OLED), a flat panel display, a solid state display, or a cathode ray tube (CRT). Additionally, the computer system 100 may include an input device 1112, such as a keyboard, and a cursor control device 1114, such as a mouse. The computer system 1100 can also include a disk drive unit 1116, a signal generation device 1118, such as a speaker or remote control, and a network interface device 1120.

In a particular embodiment, as depicted in FIG. 11, the disk drive unit 1116 may include a computer-readable medium 1122 in which one or more sets of instructions 1124, e.g. software, can be embedded. Further, the instructions 1124 may embody one or more of the methods or logic as described herein. In a particular embodiment, the instructions 1124 may reside completely, or at least partially, within the main memory 1104, the static memory 1106, and/or within the processor 1102 during execution by the computer system 1100. The main memory 1104 and the processor 1102 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 1124 or receives and executes instructions 1124 responsive to a propagated signal, so that a device connected to a network 1126 can communicate voice, video or data over the network 1126. Further, the instructions 1124 may be transmitted or received over the network 1126 via the network interface device 1120.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of configuring a network device, the method comprising:
    determining, using the network device, network device information using a boot strapping protocol during an initial set-up process of the network device;
    automatically modifying a configuration profile of the network device using the network device to enable the network device to connect to a network in a first device mode using the network device information, wherein the first device mode comprises a non-operational mode;
    receiving, at the network device, configuration information for the network device transmitted from a configuration server without the network device requesting the configuration information, wherein the configuration information is transmitted from the configuration server based on a list of Internet Protocol (IP) addresses that includes an IP address for the network device, the configuration information including routing information and configuration parameters particular to the network device; and
    automatically modifying the configuration profile of the network device using the network device to enable the network device to change from the first device mode to a second device mode based on the configuration information, wherein the second device mode comprises an operational mode;
    wherein the configuration server verifies installation of the configuration profile at the network device;
    wherein the configuration server compares a result from verification of installation of the network device to a threshold;
    wherein the configuration server generates an alert when the result is below the threshold; and
    wherein the configuration server saves installation information for the network device in a memory.

2. The method of claim 1, wherein the network device routes media content within an Internet Protocol Television (IPTV) access network.

3. The method of claim 1, further comprising transmitting a message related to modifying the configuration profile to the configuration server, wherein the message indicates a status of the modification.

4. The method of claim 1, wherein the network device information further comprises a device name.

5. The method of claim 1, further comprising ignoring media content packets received via the network when operating in the first device mode.

6. The method of claim 1, further comprising routing media content packets received via the network when operating in the second device mode.

7. The method of claim 1, wherein the configuration information is transmitted from the configuration server based on a schedule.

8. A system to configure network devices, the system comprising:
    a network interface coupled to a network;
    processing logic coupled to the network interface, the processing logic adapted to:
    determine one or more network devices to be configured;
    dynamically assemble a configuration profile for each network device of the one or more network devices;
    transmit the configuration profile for a particular network device to the particular network device via the network based on a list of Internet Protocol (IP) addresses for the one or more network devices without receiving a request for the configuration profile from the particular network device, wherein the particular network device uses the configuration profile to change from a non-operational mode to an operational mode;
    verify installation of the configuration profile at each respective network device based on data received from each respective network device via the network:
    compare results from verified installations at each respective network device to a threshold; and
    generate an alert when at least one of the results falls below the threshold; and
    a memory to store installation information for each network device.

9. The system of claim 8, further comprising a graphical user interface module to generate a graphical user interface (GUI) including information related to network devices associated with the network and including information related to scheduled network device installation.

10. The system of claim 9, wherein the GUI further comprises information indicating forecast data indicating expected completion of network device installation and configuration.

11. The system of claim 8, wherein the processing logic is adapted to provide a network management tool to manage workflow for installation of the one or more network devices.

12. The system of claim 8, further comprising a reporting module to calculate metrics related to the one or more network devices and to provide the calculated metrics to a graphical user interface generator.

13. The system of claim 8, wherein the configuration profile is transmitted to each respective network device based on a schedule.

14. A method of configuring network devices, the method comprising:
dynamically assembling a configuration profile for each network device of one or more network devices to be configured;
transmitting the configuration profile for a particular network device to the particular network device via a network based on a list of Internet Protocol (IP) addresses for the one or more network devices without receiving a request for the configuration profile from the particular network device, wherein the particular network device uses the configuration profile to change from a non-operational mode to an operational mode;
verifying installation of the configuration profile at the particular network device based on data received from the particular network device via the network;
compare a result from verification of the installation of the configuration profile at the particular network device to a threshold;
generate an alert when the results falls below the threshold; and
store installation information pertaining to the particular network device in a memory.

15. The method of claim 14, further comprising determining the one or more network devices to be configured.

16. The method of claim 15, wherein determining the one or more network devices comprises:
dynamically assigning an IP address to each of the one or more network devices; and
assembling a list of IP addresses for the one or more network devices, wherein the list represents the one or more network devices to be configured.

17. The method of claim 15, wherein determining the one or more network devices comprises receiving a list of IP addresses from a Dynamic Host Configuration Protocol (DHCP) server, wherein the list of IP addresses represent the one or more network devices to be configured.

18. The method of claim 14, further comprising:
determining network configuration information related to a network domain associated with each of the one or more network devices; and
determining unique device configuration information associated with each network device of the one or more network devices;
wherein dynamically assembling the configuration profile for each network device comprises generating the configuration profile for each network device of the one or more network devices based on the network configuration information and the unique device configuration information.

19. The method of claim 14, further comprising:
receiving data related to a schedule input from a scheduling system, wherein the data identifies a date and time to initiate operation of at least one of the one or more network devices; and
storing the data in the memory;
wherein the data comprises a target date for configuring the at least one of the one or more network devices to route media content.

20. The method of claim 14, wherein transmitting the configuration profile comprises pushing the configuration profile to the particular network device based on an IP address associated with the particular network device.

21. The method of claim 14, wherein the configuration profile is transmitted to each respective network device based on a schedule.

22. A non-transitory processor readable medium comprising a plurality of instructions executable by a processor to configure a network device, the plurality of instructions comprising instructions to:
determine one or more network devices to be configured;
dynamically generate a configuration profile for each network device of the one or more network devices; and
transmit the configuration profile for a particular network device to the particular network device via the network based on a list of Internet Protocol (IP) addresses of the one or more network devices without receiving a request for the configuration profile from the particular network device, wherein the particular network device uses the configuration profile to change from a non-operational mode to an operational mode;
verify installation of the configuration profile for the particular network device based on data received from the particular network device via the network;
compare a result for installation of the configuration profile for the particular network device to a threshold; and
generate an alert when the results falls below the threshold; and
store installation information for the particular network device in a memory.

23. The non-transitory processor readable medium of claim 22, further comprising instructions executable by the processor to generate a graphical user interface (GUI) including information related to a schedule.

24. The non-transitory processor readable medium of claim 22, further comprising instructions executable by the processor to generate a graphical user interface including information related to the one or more network devices, other network elements, and network element circuits, wherein the information includes data related to installation problems.

* * * * *